June 5, 1928.
G. H. WILLEY
1,672,107
CIRCUIT CLOSER
Original Filed Nov. 15, 1923   2 Sheets-Sheet 2
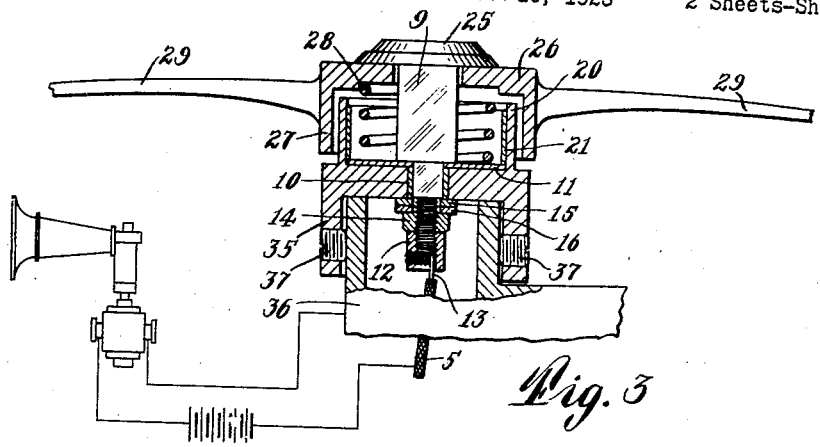
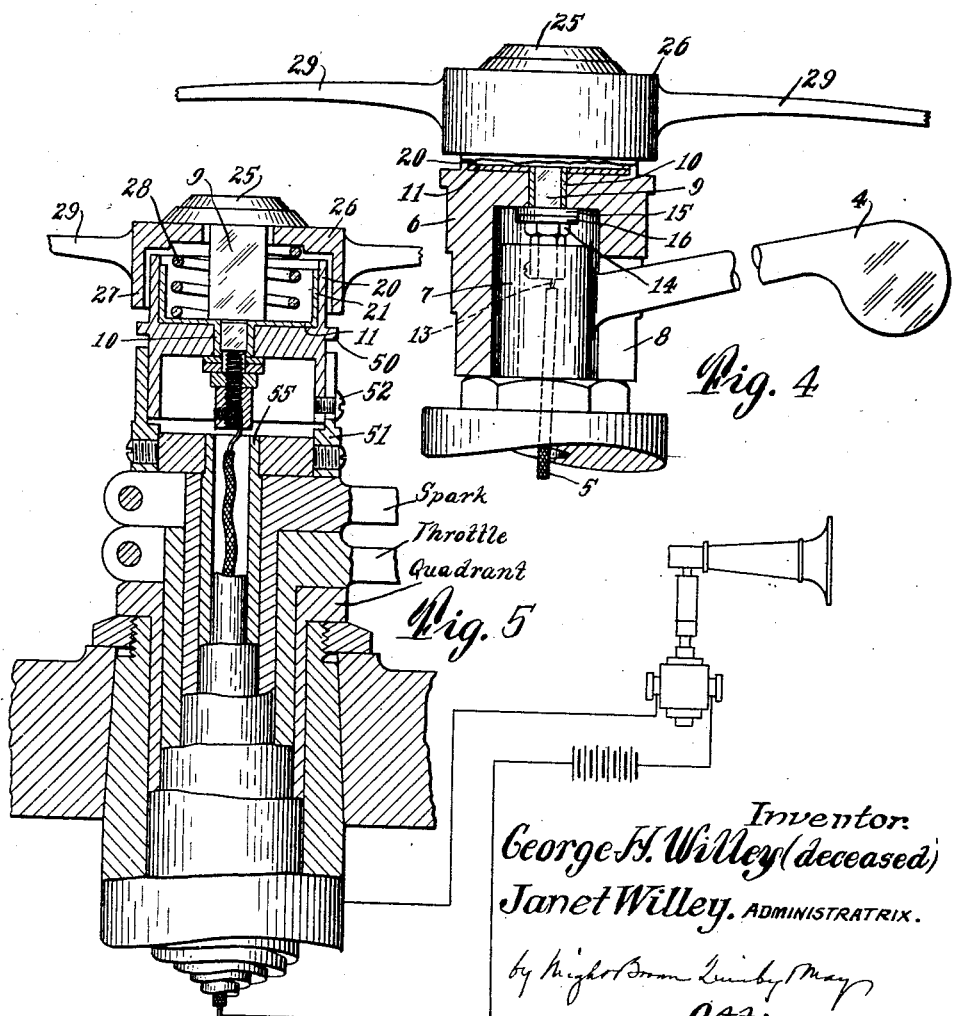
Inventor:
George H. Willey (deceased)
Janet Willey, ADMINISTRATRIX.
by [signature]
Att'ys.

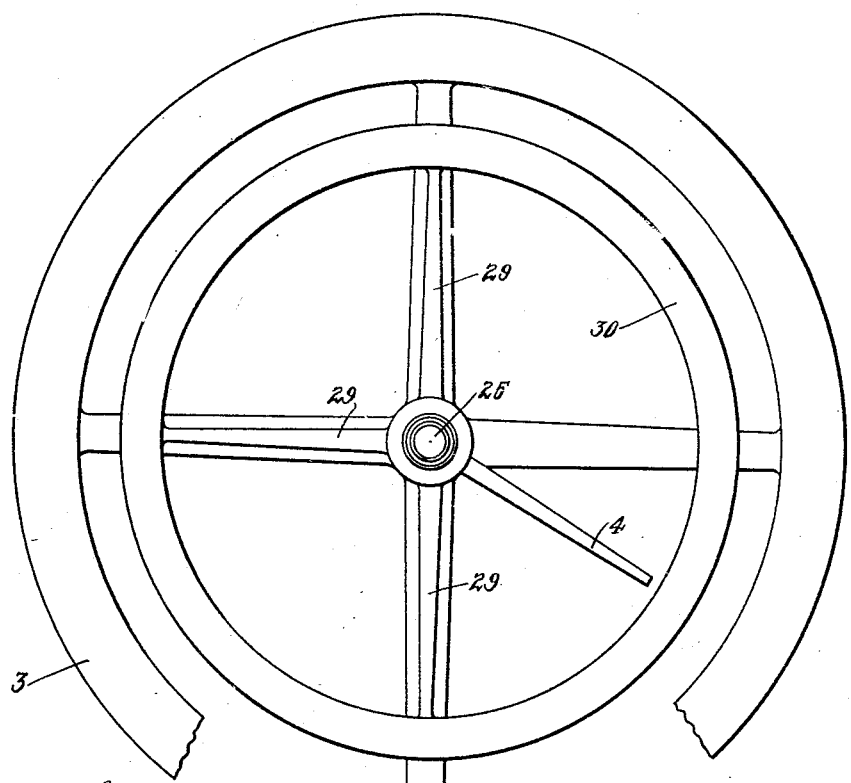
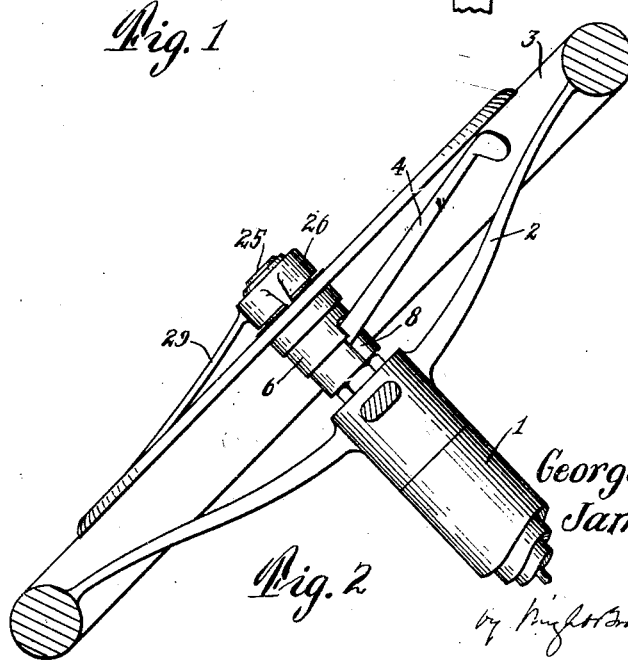

Patented June 5, 1928.

1,672,107

UNITED STATES PATENT OFFICE.

GEORGE H. WILLEY, DECEASED, LATE OR SOMERVILLE, MASSACHUSETTS, BY JANET WILLEY, ADMINISTRATRIX, OF SOMERVILLE, MASSACHUSETTS, ASSIGNOR TO WILLEY-NOYES MANUFACTURING COMPANY, OF SOMERVILLE, MASSACHUSETTS, A CORPORATION OF MASSACHUSETTS.

CIRCUIT CLOSER.

Original application filed November 15, 1923, Serial No. 676,965. Divided and this application filed June 30, 1926. Serial No. 119,619.

This invention relates to circuit closers more especially designed to close the circuits of motor vehicles or horns, the circuit closing elements being positioned at the upper end of the vehicle steering column and having an actuating element accessible from the rim of the steering wheel, this application covering subject matter divided out from application Serial Number 676,965, filed November 15, 1923, for circuit closer.

For a more complete understanding of this invention reference may be had to the accompanying drawings in which Figure 1 is a top plan of the device as mounted on the steering column of a Franklin car.

Figure 2 is a fragmentary side elevation of the upper end of the steering post, the steering wheel being shown partly in section.

Figure 3 is a longitudinal section showing the device attached thereto, this form being applicable to cars of various makes.

Figure 4 is a view partly in section of the form of the invention particularly adapted to Franklin cars.

Figure 5 is a section somewhat similar to Figure 3, but showing a somewhat modified construction.

Referring first to Figures 1, 2 and 4, at 1 is indicated the usual steering column of a vehicle adjacent the upper end of which is mounted the steering wheel 2 having the rim 3 which may be grasped by the driver of the vehicle. In Franklin cars the throttle lever is mounted to pivot at the upper end of the steering column, this lever being shown in these drawings by the numeral 4. Through the pivotal axis of this lever extends a conductor 5 (see Figure 4) forming one portion of the signal actuating circuit. The signal is actuated by electrically connecting or grounding this conductor to the steering column.

The device of the present invention comprises a cap 6 designed to fit over the upper end of the steering column, for the Franklin car this being designed to house the inner end of the throttle lever 4 which is formed as a cylindrical boss 7. This cap 6 is slotted, as at 8, so that the lever 4 may extend therethrough, the side walls of the slot engaging opposite sides of the lever. By this construction rotation of the cap 6 relative to the steering column acts to turn the throttle lever 4 and consequently to control the supply of fuel to the engine. Through the cap 6 centrally thereof extends a post 9 insulated by a sleeve 10 in the cap 6 and preferably of polygonal cross section in order that rotation imparted thereto may effect rotation of the cap 6. As shown more particularly in Figure 3 in which, however, a different form of cap is employed, the post 9 is of enlarged cross section above the cap and rests on a disk of insulating material 11 seated on the upper face thereof. The lower end 12 of the post is threaded and is adapted to receive a connector 13 to which the wire 5 is attached. The post is clamped to the cap by means of a nut 14 also threaded on the portion 12, a washer 15 of insulating material being interposed between the lower face of the cap and a washer 16 against which the nut 14 bears. Extending upwardly from the upper face of the cap 6 is an annular flange 20 which is preferably lined with a ring 21 of insulating material. The upper end of the post 9 is formed with a head 25 and slidable beneath this head axially of the post, but preferably non-rotatable relative thereto, is an inverted cup-shaped element 26 having an annular flange 27 surrounding and normally spaced from the flange 21. This member 26 is of conducting material and may be brought into engagement with either the top face of the cap outwardly of the flange 21, or against the outer face of this flange, by depressing the element 26 or by rocking it relatively to the post 9. This element 26 is normally held out of contact with the cap and the flange by means of a spring 28 surrounding the post 9 and bearing between the insulating disk 11 and the lower face of the element 26 within the flange 21. This element 26, therefore, is normally out of contacting relation so that the circuit is incomplete between the conductor 5 and the steering column. It may be moved to circuit-closing position, however, either by depressing it evenly to contact with the upper face of the cap as above described, or by rocking it slightly to contact with the flange 21.

For so actuating this element it is provided with outwardly extending arms 29 which support at their outer ends, a ring 30 which may be integral therewith and which is positioned closely adjacent to the rim 3 of the steering wheel so that the operator may readily reach it with his thumb or fingers and press it or tilt it, as he may desire, to close the signal circuit. As in the form of this device shown in Figures 1, 2 and 4, the cap 6 is in operative engagement with the throttle lever 4, axial rotation of the ring 30 also acts to move this lever and so control the speed of the vehicle.

In other makes of cars where the control levers for the spark and throttle are carried by a quadrant mounted at the upper end of the steering column, the particular form of cap shown in Figure 3 may be employed. In this form of cap the marginal flange 35 surrounds the upper end of the tubular member or hub 36 of the spark lever at the upper end of the steering column and may be made fast thereto by means of set screws 37. In this form the turning of the cap acts to advance or retard the spark depending on the direction in which it is rotated. The wiring connections between the steering column and the central conductor to the signal have been indicated diagrammatically in this figure, but as these are well known no extended description thereof is deemed necessary.

Figure 5 also shows a construction wherein the device of this invention is built into a post especially designed to receive it instead of being formed as an attachment, though it should be understood that where this is done it will not ordinarily be necessary or desirable to use a vertically adjustable cap. As shown in this figure, however, the cap is fixed to the upper end of a stationary sleeve 55 extending centrally of the steering post and through which the conducting wires are passed, the sleeves through which the spark, throttle, and steering gear are controlled being arranged externally thereof as shown.

The combination wherein the signal actuating element may also be actuated to effect a control of the vehicle such as the throttle of the engine is claimed in the parent application for patent hereinbefore referred to.

Having thus described certain embodiments of this invention it should be evident to those skilled in the art that various changes and modifications may be made therein without departing from its spirit or scope as defined by the appended claims.

I claim:

1. A device of the class described comprising a cap at the upper end of a vehicle steering column and having an anular flange projecting from its upper face, a central post insulated from said cap projecting centrally of said flange, an inverted cup-shaped element having a central opening slidable over said post and enclosing said flange, a head on said post above said element, and a spring within said flange and bearing at opposite ends between said cap and element and urging said element against said head and out of electrical contact with said cap, said element being movable against the action of said spring to make electrical connection between said post and cap.

2. A device of the class described comprising a cap at the upper end of a vehicle steering column and having an annular flange projecting from its upper face, a central post insulated from said cap projecting centrally of said flange, an inverted cup-shaped element having a central opening slidable over said post and enclosing said flange, a head on said post above said element, a spring within said flange and bearing at opposite ends between said cap and element and urging said element against said head and out of electrical contact with said cap, said element being movable against the action of said spring to make electrical connection between said post and cap, arms projecting outwardly from said element, and an annular actuating member carried at the outer ends of said arms in proximity to the rim of the vehicle steering wheel.

3. A device of the class described comprising a cap at the upper end of a vehicle steering column and having an annular flange projecting from its upper face, an insulating lining for said flange and the upper face of said cap enclosed thereby, a central post insulated from said cap projecting centrally of said flange, an inverted cup-shaped element having a central opening slidable over said post and enclosing said flange, a head on said post above said element, and a spring within said flange and bearing at opposite ends between said lining and element and urging said element against said head and out of electrical contact with said cap, said element being movable against the action of said spring to make electrical connection between said post and cap.

4. A device of the class described comprising a cap at the upper end of a vehicle steering column and having an annular flange projecting from its upper face, an insulating lining for said flange and the upper face of said cap enclosed thereby, a central post insulated from said cap projecting centrally of said flange, an inverted cup-shaped element having a central opening slidable over said post and enclosing said flange, a head on said post above said element, a spring within said flange and bearing at opposite ends between said lining and element and urging said element against said head and out of electrical contact with said cap, said element being movable against the action of said spring to make electrical connection between said post and cap, arms projecting outwardly from said element, and an annular actuating member carried at the outer ends of said arms in proximity to the rim of the vehicle steering wheel.

5. A device of the class described comprising a cap at the upper end of a vehicle steering column, an annular flange extending upwardly from said cap, a post insulated from said cap and extending axially of said flange, and a circuit-closing element slidable on said post and constructed to contact with either the outer face of said flange or the upper face of said cap.

6. A device of the class described comprising a cap at the upper end of a vehicle steering column, an annular flange extending upwardly from said cap, a post insulated from said cap and extending axially of said flange, a circuit-closing element slidable on said post and constructed to contact with either the outer face of said flange or the upper face of said cap, and means for normally holding said element out of contact with said flange and cap.

In testimony whereof I have affixed my signature.

Mrs. JANET WILLEY,
*Administratrix Estate of George H. Willey.*